March 25, 1930.  J. E. THIELER  1,752,122
INDICATOR
Filed March 28, 1928   3 Sheets-Sheet 1
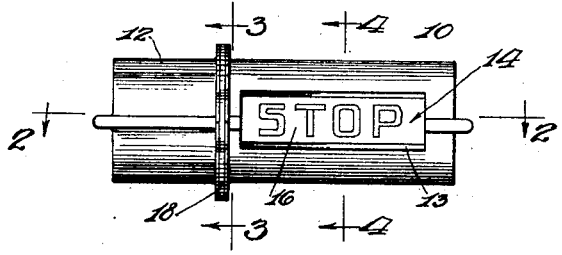
JULIUS E. THIELER.
INVENTOR March 25, 1930.  J. E. THIELER  1,752,122
INDICATOR
Filed March 28, 1928   3 Sheets-Sheet 2
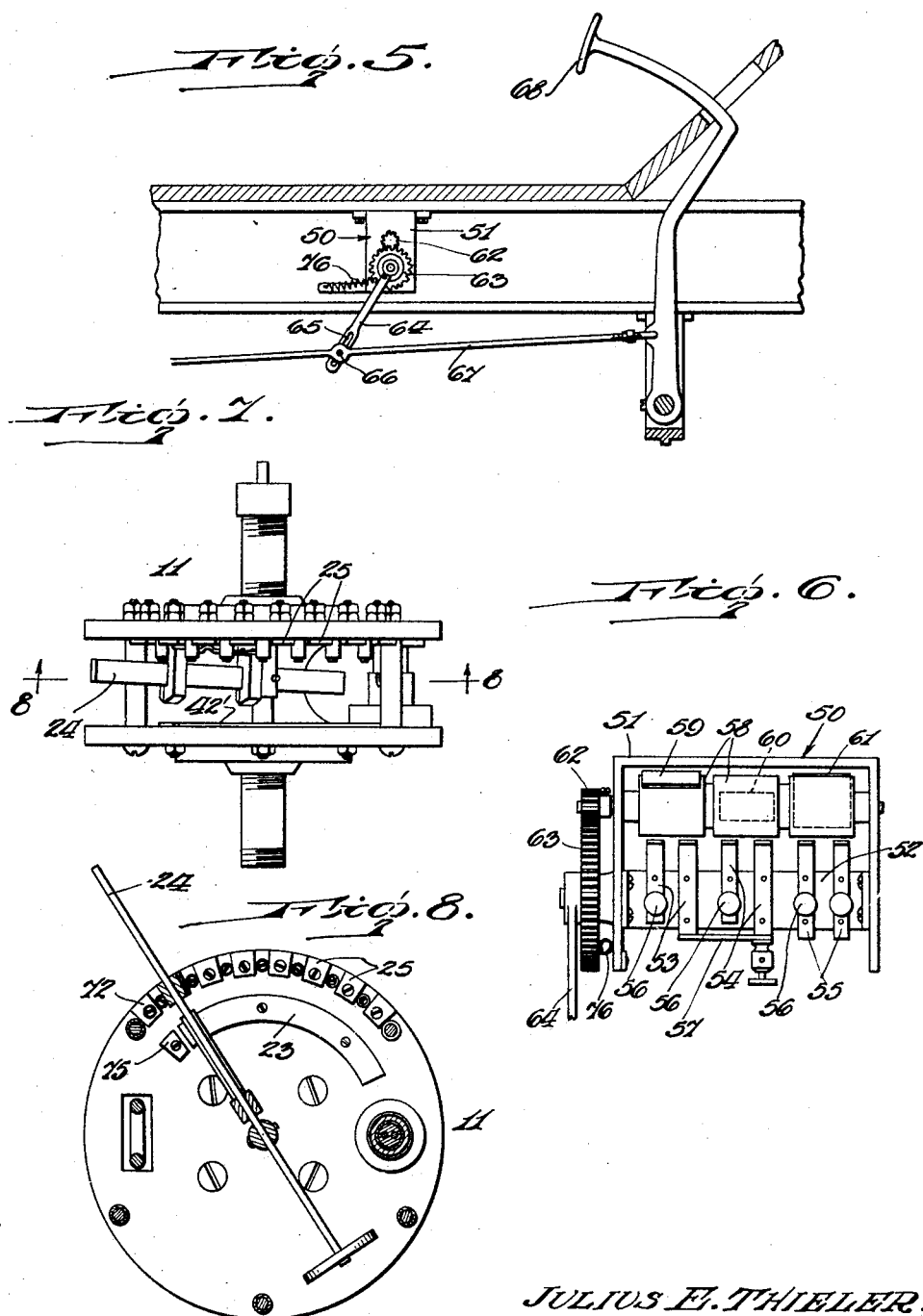

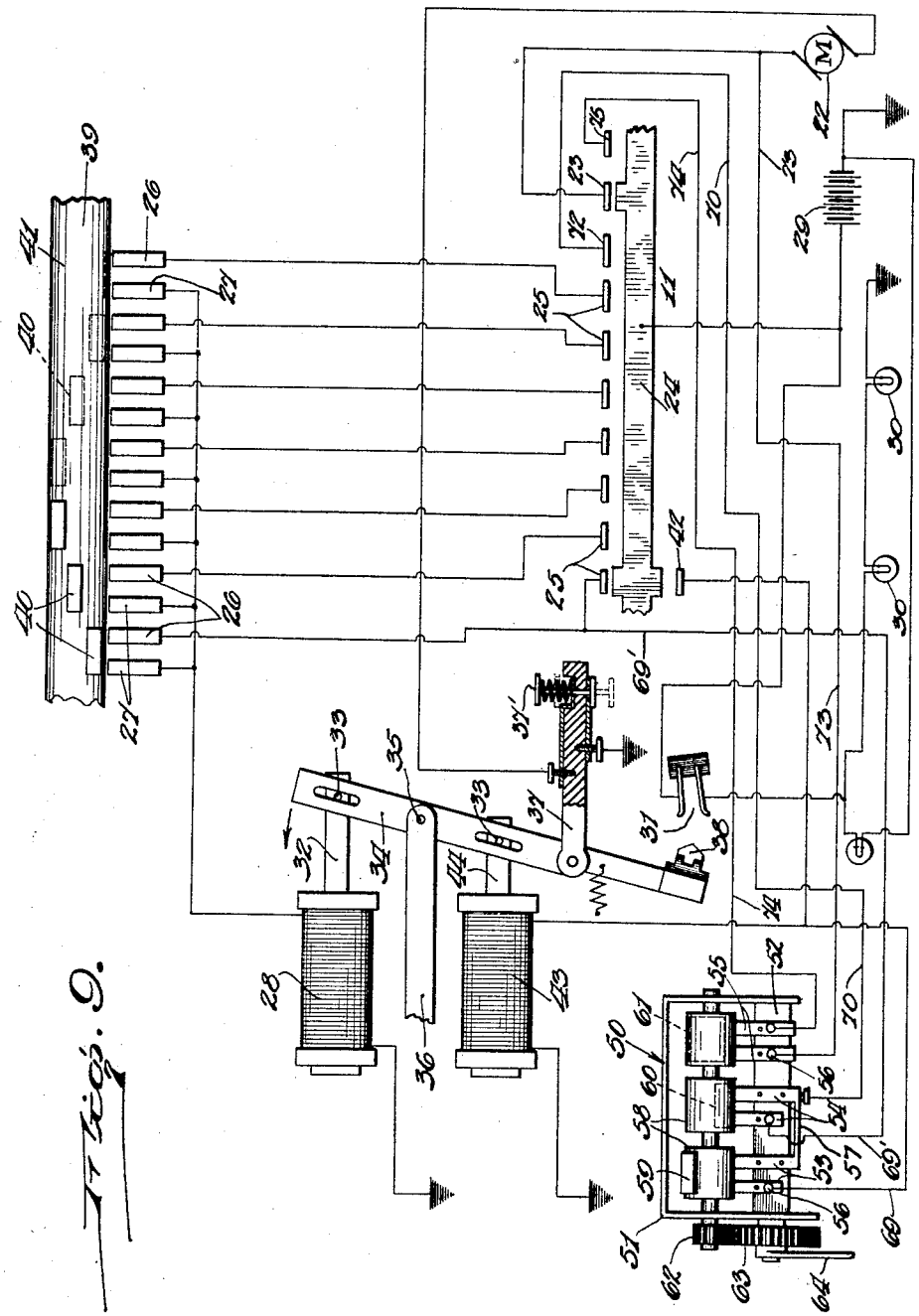

Patented Mar. 25, 1930

1,752,122

UNITED STATES PATENT OFFICE

JULIUS E. THIELER, OF NEW YORK, N. Y.

INDICATOR

Application filed March 28, 1928. Serial No. 265,394.

This invention relates to indicators and signalling devices.

More particularly the invention relates to indicators and signalling devices which are manually controlled and which are of the electric type.

Some of the objects of the invention are: to produce a comparatively practical, efficient and effectual device of the character mentioned; to produce an indicator which embodies a signal display unit which is arranged at one point, and a controlling unit which is arranged at a point remote from the signal display unit; to employ in the signal display unit a plurality of signals or indicia bearing panels each of which is transparent and whose signal or indicia is displayed by being illuminated by rays of lamps placed behind the same, and only when the lamps are lighted; to employ a rotatable frame which embodies said signal or indicia bearing panels which is motor driven, and means for selectively displaying the signal or indicia bearing panels; and with these and other objects in view, the invention resides in the particular combination, arrangement and operation of parts hereinafter fully described and illustrated in the accompanying drawings, in which:—

Figure 1 is a front elevation of the signal display unit.

Figure 2 is a sectional view taken on the line 2—2 of Figure 1.

Figure 3 is a vertical transverse sectional view on the line 3—3 of Figure 1.

Figure 4 is a similar view on the line 4—4 of Figure 1.

Figure 5 is a side elevational view of the foot actuated switch.

Figure 6 is a top plan view of the foot actuated switch.

Figure 7 is a side elevational view of the hand switch.

Figure 8 is a horizontal sectional view on the line 8—8 of Figure 7.

Figure 9 is a diagrammatic view illustrating several circuits of the indicator and the hand and foot operated instrumentalities used in conjunction with the circuits.

Referring now more particularly to the several views of the drawing, it will be apparent that, the indicator of the present invention will include a signal display unit 10, an operator's controlling unit 11, and a foot controlled unit 50. In accordance with the present invention the signal display unit 10 is arranged in a conspicuous place at the rear end of a vehicle for instance, whereas the operator's controlling unit 11 will be arranged at a point remote from the unit 10 such as at a point near the vehicle operator's seat while the unit 50 is disposed beneath the flooring of the vehicle between the chassis frame. The suggestion just made has reference to an automobile, but obviously the indicator may be used or arranged on other types of vehicles such as street cars or wherever signals are to be flashed or displayed.

The signal display unit 10 includes a casing 12 which embodies means for attaching the same, and the said casing has a sight opening 13 in the front wall thereof. Arranged within the casing 12 is a rotatable drum 14 which comprises spiders 15 which support a plurality of signal or indicia bearing panels 16; the spiders 15 being arranged respectively at the opposite ends of said panels. Each spider 15 has a central stub shaft and these stub shafts are indicated by the reference numeral 17 and 17'. The stub shaft 17 is journaled in a suitable bearing carried by the partition 18, while the stub shaft 17' is fixed in a manner which will be later described. The stub shaft 17 has attached thereto a gear 20 with which a gear 21 of the shaft of a motor 22 meshes, so that upon the operation of the motor and by virtue of the intervention of the gears 21 and 20, motion will be imparted to drum 14. The panels 16 of the drum 14 are so disposed that they may be brought selectively into registration with the sight opening 13. There are seven panels in the present instance each of which embodies a certain signal or certain indicia. In the present instance the panels respectively bear the following indicia, namely Stop, Slow, Forward, Pass, Reverse, Left and Right. The words Left and Right are also accompanied with arrows which indicate direction in accord with the word respectively with which they are associated. In order that the desired indicia bearing panel 16 may be brought into registration with the sight opening 13, and further, in order that the particular indicia bearing panel may be illuminated there is provided devices presently described.

By referring to the drawings and especially to Figure 9 it will be seen that there is employed a series circuit having a motor 22, contact segment 23, spring actuated pivotally mounted member 24, contacts, 25, 26 and 27, an electro-magnetic device 28, and battery 29. A second series circuit is employed which has therein lamps 30, contacts 31, and battery 29. The device 28 includes a core 32 which has one end thereof pivotally connected as at 33 to a member 34 pivotally mounted as at 35 to a stationary support 36. The member 34 carries an arresting member 37 and the free end of the member 34 has a contact 38 which is capable of bridging the contacts 31. It will now be manifest that by moving the member 24 so as to bring portions thereof respectively into engagement with a contact 25 and the segment 23 that, among other things the motor 22 will rotate and as a consequence the drum 14 will also be rotated. By employing a rotatable make and break device 39, it is possible to complete the circuit from the battery 29 through member 24, through contacts 25, 26 and 27 to the coil of the device 28 which magnetizes core 32 and causes the same to move into the direction of the arrow thus causing the member 34 to move on its pivot 35 with the result that the member 37 will be moved into engagement with a portion of the related spider 15 and the contact 38 will be moved between the contacts 31 to bridge the same. The free end of the arresting member 37 supports a spring pressed switch 37' which normally closes the circuit to the motor but which circuit is broken when the member is inserted between legs of the spider at which time the spider operates the switch 37' by engaging the same, to break the connection thus shutting off the motor. It will be manifest that by the single manipulation of the member 24 the motor 22 is set in motion to rotate the drum 14 and the device 39, and that such action is followed by the lighting of the lamps 30 and the movement to the member 37 to an obstructing position. By moving the member 24 so as to separate the portions thereof from engagement with the contact 25 and the segment 23, the motor will be stopped and therefore cannot further rotate the drum 14 which is held against movement in a forward direction by the arresting member 37 and in a rearward direction by a ratchet mechanism which will be later described.

Inasmuch as there are seven panels 16 employed each of which bears distinctive indicia there are provided seven of each of the contacts 25, 26 and 27. There are also provided seven contacts 40 as parts of the circuit closing device 39. Each contact 40 is arranged on the cylinder 41 of the device 39 with respect to the arrangement of the particular panels of the drum 14. The cylinder of the circuit closing device is mounted for rotary movement and is connected through a gear train with the motor 22 as clearly shown in Figure 2. In other words, each contact 40 operates in conjunction with the pair of contacts 26 and 27 so that when a particular and desired panel is in registration with the sight opening 13 its corresponding contact 40 will bridge a particular pair of contacts 26 and 27, and due to the fact that a portion of the member 24 is in engagement with a particular contact 25 it is possible to move the obstructing member 37 to engage a portion of the adjacent spider 15 to maintain the proper registration of the intended panels 16. The contacts 27 are connected of course in parallel with the coil of the device 28, whereas the seven contacts 25 are connected respectively to the seven contacts 26. The contacts 26 and 27 are carried by a support 42 arranged in juxtaposition to the device 39 and both the device 39 and support 42 are arranged within the casing 12; the former being rotatably supported in suitable bearings and the latter being held stationary.

In order that the arresting member 37 can be withdrawn from engagement with a portion of the spider 15, and further, in order that the contact 38 may be moved from between the contacts 31 there is provided a series circuit which has therein battery 29, member 24, contact segment 42' and electromagnetic device 43. The core 44 of the device 43 is connected to the member 34. Upon the movement of a portion of the member 24 into engagement with the segment 42 a circuit will be closed through the coil of the device 43 and as a result the core 44 will be moved to its normal position and the member 37 will be in an unobstructing position while the contact 38 will be withdrawn from between the contacts 31. It follows that the lamps 30 will be out and the drum 14 will be free to rotate.

It is to be understood that the devices 28, and 43 and the contacts 31 are arranged within the casing 12, and the lamps 30 are preferably supported by a bar 45 which receives support from the partition 18. The lamps are spaced and lie directly behind the sight opening 13. The stub shaft 17' is fixed in a collar 46 formed with an arm 47 of the bar 45 and the spider of the stub shaft 17' is journaled thereon as shown in Figure 2.

The contacts 25 and segments 23 and 42 are embodied by the controlling unit 11 as is the member 24. The arrangement of these parts is such that by one manipulation of the member 24, the contacts 25 and the segment 23 may be simultaneously engaged or disengaged and by another manipulation a portion of the member 24 is brought into engagement with the segment 42 for the purpose specified. The member 24 may also be moved to a neutral position.

For preventing retrograde movement of the drum 14, I provide a ratchet wheel 76 on the stub shaft 17 adjacent the gear 20 and with which a spring pressed pawl 77 co-acts. Any tendency which the drum may have to move in a backward direction is prevented by the ratchet and pawl mechanism with the result it will be apparent that the ratchet and pawl mechanism, together with the arresting member 37 by the engagement of the spider with the switch 37' operates to prevent movement of the drum by vibration or other causes, as if the ratchet and pawl mechanism was not employed, the spider in striking the switch 37' may open the same only momentarily due to the spring of the switch 37', which would have a tendency to cause rearward movement of the drum and allow the switch 37' to close, therefore energizing the motor which of course would result in forward movement of the drum, to again operate the switch, therefore the drum would oscillate a certain extent, but the ratchet and pawl mechanism together with the arresting member will prevent such oscillation and hold the drum in a steady position, whereby the selected indicia will be displayed in true registration with the window, substantially immediately upon the spider opening the switch 37'.

The foot actuated switch 50 heretofore referred to only broadly comprises a U-shaped supporting bracket 51 within which is supported a block 52 of insulating material and which in turn supports pairs of contacts 53, 54 and 55. Suitable wire connectors 56 are electrically connected to one of each of the sets of contacts 53 and 54 while each contact of the set 55 is provided with a connector. A strip of conducting material 57 connects one contact of the set 53 with a corresponding contact of the adjacent set 54.

A roller 58 of insulating material is journalled in the bracket 51 adjacent the sets of contacts and supports spaced contact plates 59, 60 and 61 for respectively bridging the stationary sets of contacts 53, 54 and 55. A relatively small gear 62 is keyed to the same shaft on which the roller is mounted and is disposed on the outside of the bracket for mesh with a large gear 63 rotatably mounted upon the exterior of the bracket. An arm 64 extends from the gear and has its free end formed with a slot 65 for connection with a pin 66 carried by the rod 67 leading from the brake pedal 68 to the brake drums of the vehicle.

In Figure 9 of the drawings there is shown a diagrammatic view of my improved switch in circuit with a signal device which has been fully set forth and it will be seen that a wire 69 leads from the connector 56 of one of the contacts of the set 53 to the magnet 43 and a wire 69' leads from one of the contacts of the set 54 to one of the contacts 26, while a wire 70 leads from the other contact of the set 54 to a contact 72 in the path of movement of the member 24. A wire 73 leads from one of the contacts 55 to the motor 22 while a wire 74 leads from the other contact of the set 55 to a contact 75 also arranged in the hand switch and which is engaged by the member 24. When the contacts 72 and 75 are bridged by the member 24 the signal is set for operation by the foot actuated switch 50.

When the hand switch is set as just mentioned and the brake pedal 68 depressed, the roller will be rotated through the rod 67, arms 64 and gears 62 and 63. As the roller revolves, the set of contacts 53 are first bridged by the plate 59 which operates the magnet to release the obstruction 37 from between the spokes 15 of the drum. Upon further movement of the roller, the plate 61 bridges the set of contacts 55 to operate the motor 22 to rotate the drum, after which the plate 60 moves into engagement with the set of contacts 54 which energizes the magnet 28 for extending the obstructing member 37 within the path of movement of the spider 15 thereby bringing the stop signal into registry with the opening in the casing, at which time the switch 31 is closed which lights the lamps 30 and simultaneously breaks the switch 37' which stops the operation of the motor.

When pressure is released from the brake pedal, a spring 76 attached to the large gear 63 and a portion of the bracket returns the roller 58 to normal position.

What is claimed as new is:—

In a vehicle signalling device, a rotatably mounted drum having signalling indicia thereon to be selectively displayed, a motor for rotating said drum, an arresting member movable into the path of a part of said drum, a normally closed spring pressed switch mounted on said arresting member and engageable by said part, an electric motor circuit including said switch and said motor, said switch being opened when engaged by the part to open the circuit to the motor, said arresting member preventing forward movement of said drum, ratchet means to prevent retrograde movement of said drum, and electro-magnetic means for moving said arresting member into and out of the path of said part for controlling the actuation of said motor circuit.

In testimony whereof I have affixed my signature.

JULIUS E. THIELER.